(12) United States Patent
Faruque et al.

(10) Patent No.: US 11,884,229 B1
(45) Date of Patent: Jan. 30, 2024

(54) VEHICLE INCLUDING A MOVEABLE CONSOLE WITH AIRBAG

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/821,242

(22) Filed: Aug. 22, 2022

(51) Int. Cl.
| | |
|---|---|
| *B60R 21/20* | (2011.01) |
| *B60R 21/231* | (2011.01) |
| *B60N 2/75* | (2018.01) |
| *B60R 7/04* | (2006.01) |

(52) U.S. Cl.
CPC .............. *B60R 21/20* (2013.01); *B60N 2/753* (2018.02); *B60R 7/04* (2013.01); *B60R 21/231* (2013.01); *B60R 2021/23161* (2013.01)

(58) Field of Classification Search
CPC . B60R 21/20; B60R 2021/23161; B60R 7/04; B60R 21/231; B60N 2/753
See application file for complete search history.

(56) References Cited

U.S. PATENT DOCUMENTS

| | | | | |
|---|---|---|---|---|
| 5,312,131 A | * | 5/1994 | Kitagawa | B60R 21/206 280/730.2 |
| 6,142,521 A | * | 11/2000 | Shephard | B60R 21/261 280/751 |
| 6,921,118 B2 | * | 7/2005 | Clark | B60R 7/06 296/37.14 |
| 7,494,170 B2 | * | 2/2009 | Hanzel | B60R 11/00 296/37.8 |
| 9,487,177 B2 | | 11/2016 | Schneider et al. | |
| 10,661,717 B2 | * | 5/2020 | Lee | B60R 7/04 |
| 2004/0026947 A1 | * | 2/2004 | Kitano | B60R 11/0235 296/24.34 |
| 2009/0001695 A1 | * | 1/2009 | Suzuki | B60R 21/231 280/730.2 |
| 2018/0043853 A1 | * | 2/2018 | Taguchi | B60R 21/20 |
| 2020/0062213 A1 | | 2/2020 | Gao et al. | |
| 2020/0317155 A1 | * | 10/2020 | Deng | B60R 21/23138 |
| 2022/0242353 A1 | * | 8/2022 | Binder | B60N 3/001 |

FOREIGN PATENT DOCUMENTS

| | | | |
|---|---|---|---|
| DE | 102008044185 A1 | 6/2020 | |
| FR | 2791622 A1 | 10/2000 | |
| FR | 2812602 A1 | * 2/2002 | ............ B60N 2/773 |
| FR | 3075127 A1 | 6/2019 | |

OTHER PUBLICATIONS

Gallinato, Feb. 2002, FR 2812602 A1, Machine Translation of Specification (Year: 2002).*

* cited by examiner

*Primary Examiner* — James A English
*Assistant Examiner* — Matthew Joseph Ganci
(74) *Attorney, Agent, or Firm* — Frank A. MacKenzie; Bejin Bieneman PLC

(57) ABSTRACT

A vehicle includes a dash. A first seat and a second seat are spaced from the dash. A console is adjacent to the dash with the console being movable from a stowed position disposed in the dash to a deployed position extending from the dash between the first seat and the second seat. An airbag is supported by the console with the airbag being inflatable to an inflated position when the console is in the deployed position.

18 Claims, 8 Drawing Sheets

VEHICLE INCLUDING A MOVEABLE CONSOLE WITH AIRBAG

BACKGROUND

A vehicle may include a middle console assembly between two seats. The middle console assembly includes a middle console supported by a floor of the vehicle. Specifically, the middle console may extend upwardly from the floor between the first seat and the second seat. In such an example, the middle console abuts the floor. The middle console may include cup holders and may support vehicle controls, e.g., a gear shifter, window controls, HVAC controls, multimedia controls, etc.

The middle console assembly may include an armrest. The armrest is above the middle console and, for example, may be supported by the middle console. The armrest is designed to support the arm of occupants of the vehicle seated in the front seats. Specifically, the armrest is sized, shaped, and positioned to support the arm of the occupant. The armrest may be upholstered, e.g., with a covering of vinyl, leather, etc. The middle console assembly, specifically the middle console, may include a storage compartment below the armrest.

DETAILED DESCRIPTION

Figure 1:
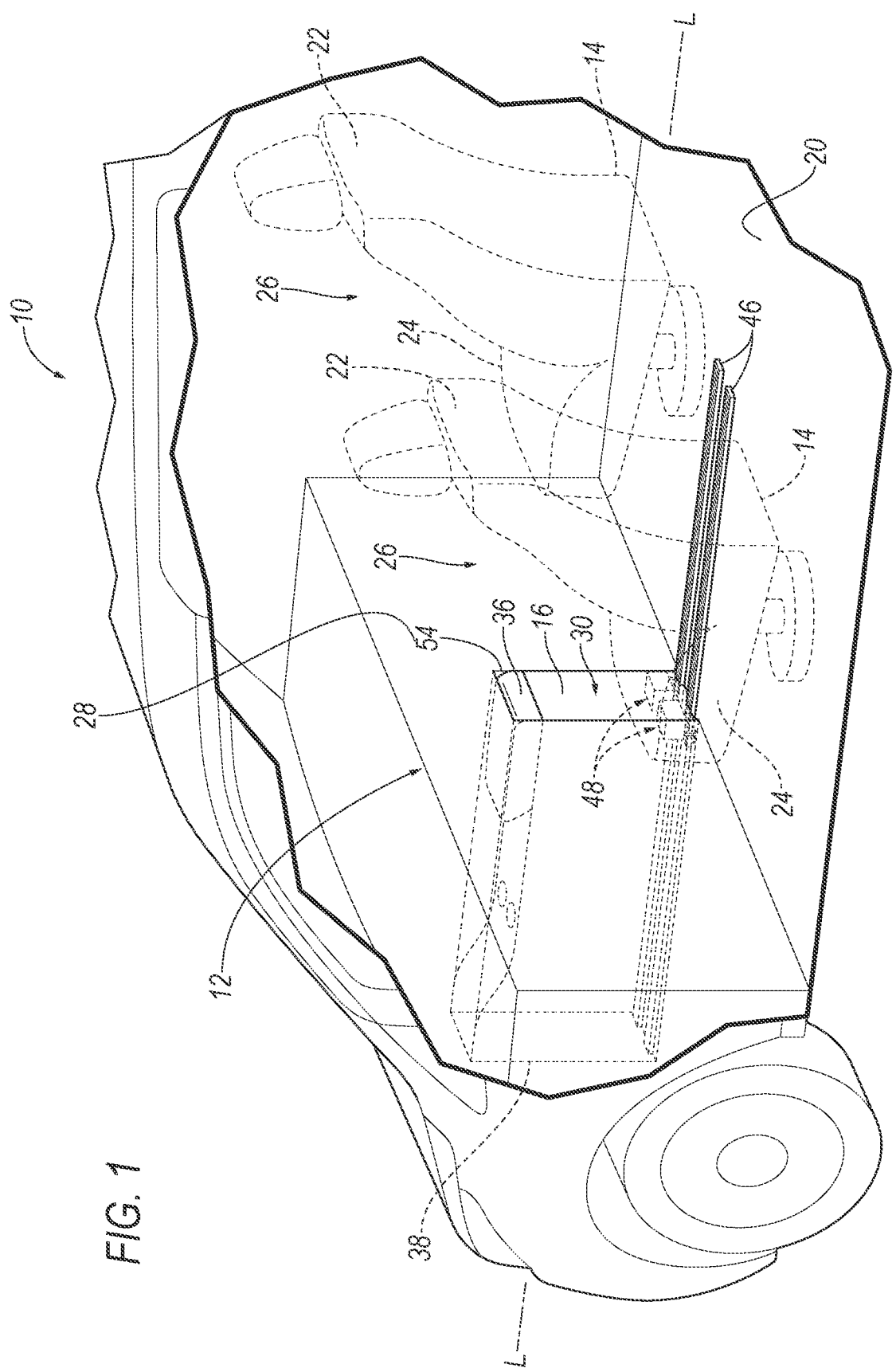
FIG. 1 is a perspective view of a vehicle having a console assembly including a console moveable along a vehicle floor and positioned in a stowed position.

A vehicle includes, a dash, a first seat, a second seat, and a console. The console is adjacent to the dash. The console is movable relative to the dash between a stowed position and a deployed position. The console is disposed in the dash in the stowed position and movable away from the dash between the first seat and the second seat from the stowed position to the deployed position. An airbag is supported by the console. The airbag is inflatable to an inflated position when the console is in the deployed position.

The airbag in the inflated position may extend between the first seat and the dash.

The vehicle may include a second airbag supported by the console and inflatable to an inflated position when the console is in the deployed position. The second airbag in the inflated position may extend between the second seat and the dash. The console may be between the airbag and the second airbag in the inflated position. The airbag in the inflated position may be between the first seat and the dash and extend vehicle-rearward from the dash vehicle-outboard of the first seat. The second airbag in the inflated position may be between the second seat and the dash and extend vehicle-rearward from the dash vehicle-outboard of the second seat.

The airbag in the inflated position may extend vehicle-outboard of the first seat.

The first seat may include a seat bottom and the airbag in the inflated position may be horizontally aligned with the seat bottom.

The first seat may include a seat bottom and the airbag in the inflated position may be between the seat bottom and the dash and extend vehicle-rearward from the dash vehicle-outboard of the first seat.

The console may include a vehicle-forward end engaged with the dash in the deployed position.

The airbag in the inflated position may abut the dash.

The vehicle may include a vehicle floor and a track between the console and the vehicle floor. The console may be moveable along the track from the stowed position to the deployed position.

The vehicle may include an inflator supported by the console and fluidly connected to the airbag.

The dash may include a tunnel that receives the console in the stowed position. The console may include a vehicle-forward end engaged with the tunnel of the dash in the deployed position. The console may include a vehicle-rearward end. The vehicle-rearward end may be flush with the dash at the tunnel in the stowed position and spaced from the dash in the deployed position.

The console may include a vehicle-rearward end. The vehicle-rearward end may be flush with the dash in the stowed position and spaced from the dash in the deployed position. The vehicle may include a vehicle floor and a track between the console and the vehicle floor. The console may be moveable along the track from the stowed position to the deployed position. The vehicle-rearward end may be engaged with the track in the deployed position.

With reference to the Figures, wherein like numerals indicate like parts throughout the several views, a vehicle 10 includes a dash 12. A first seat 14 and a second seat 14 are spaced from the dash 12. A console 16 is adjacent the dash 12. The console 16 is movable relative to the dash 12 between a stowed position (FIG. 1) and a deployed position (FIG. 2). The console 16 is disposed in the dash 12 in the stowed position and is movable away from the dash 12 between the first seat 14 and the second seat 14 from the stowed position to the deployed position. An airbag 18 is supported by the console 16. The airbag 18 is inflatable to an inflated position when the console 16 is in the deployed position.

Since the airbag 18 is mounted to the console 16, the airbag 18 moves with the console 16 as the console 16 moves between the stowed position and the deployed position. The console 16 may be in the stowed position when the vehicle 10 is unoccupied for ease of occupant ingress. The console 16 in the deployed position positions the airbag 18 relative to the seats 14 to control the kinematics of occupants of the seats 14 when the console 16 is in the deployed position. The airbag 18 is inflatable between the dash 12 and one of the seats 14 to the inflated position to control the kinematics of occupants of the vehicle 10 during a vehicle impact. The dash 12 may act as a reaction surface for the airbag 18 when the airbag 18 is loaded by an occupant in certain impacts.

Figure 2:
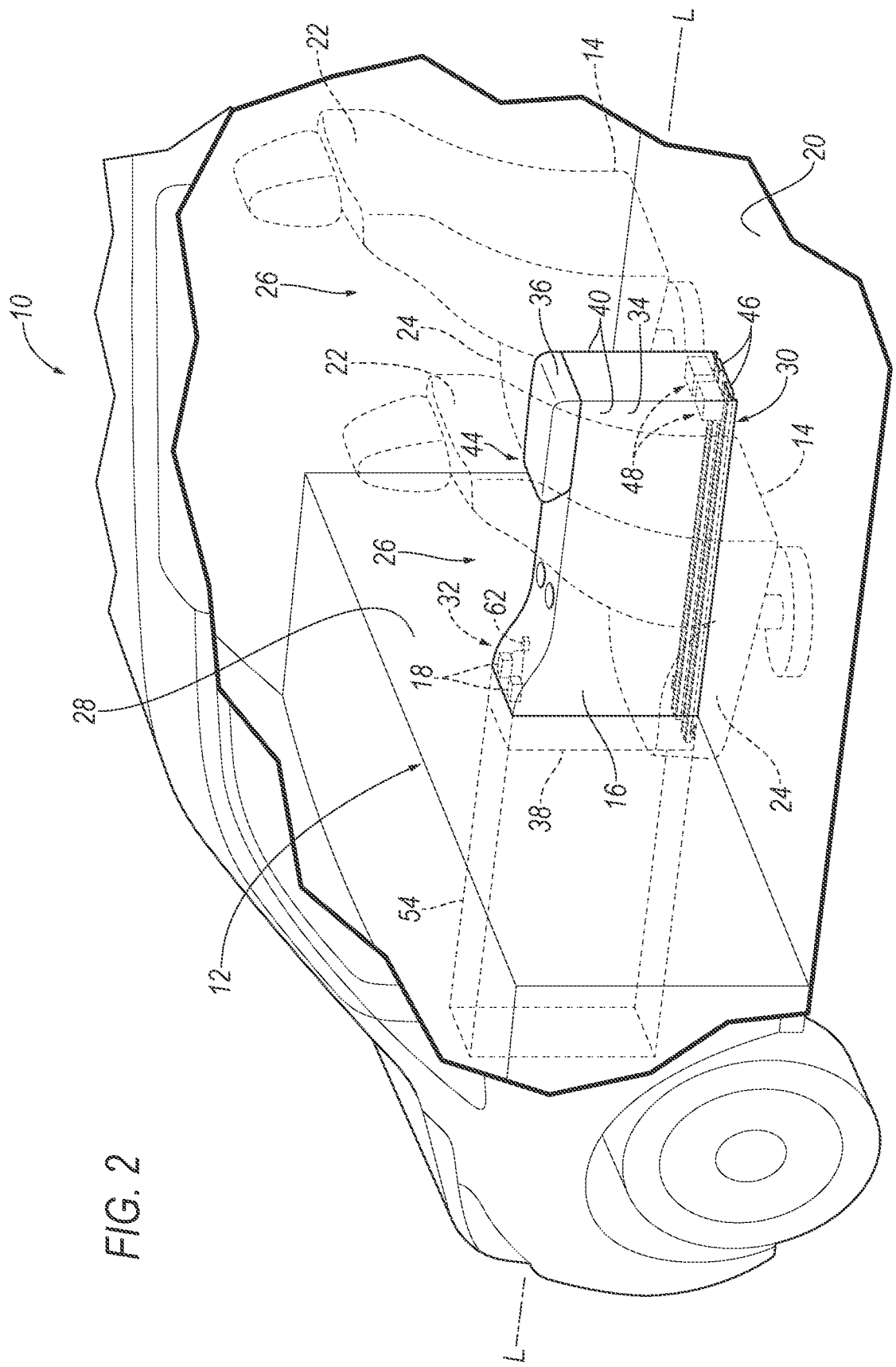
FIG. 2 is a perspective view of the vehicle with the console assembly in a deployed position.
Figure 3:
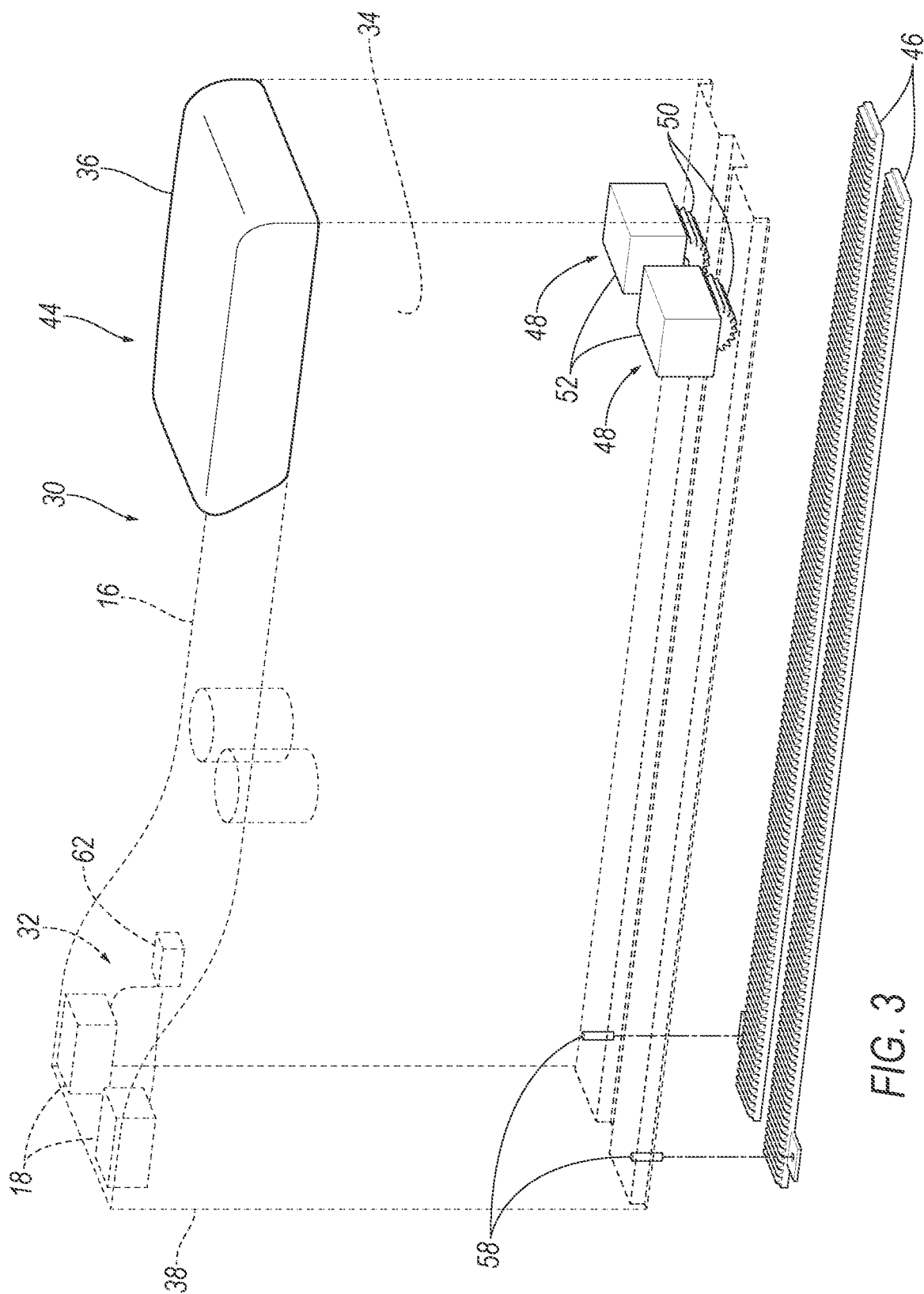
FIG. 3 is an exploded view of the console assembly from tracks on a vehicle floor of the vehicle.
Figure 4:
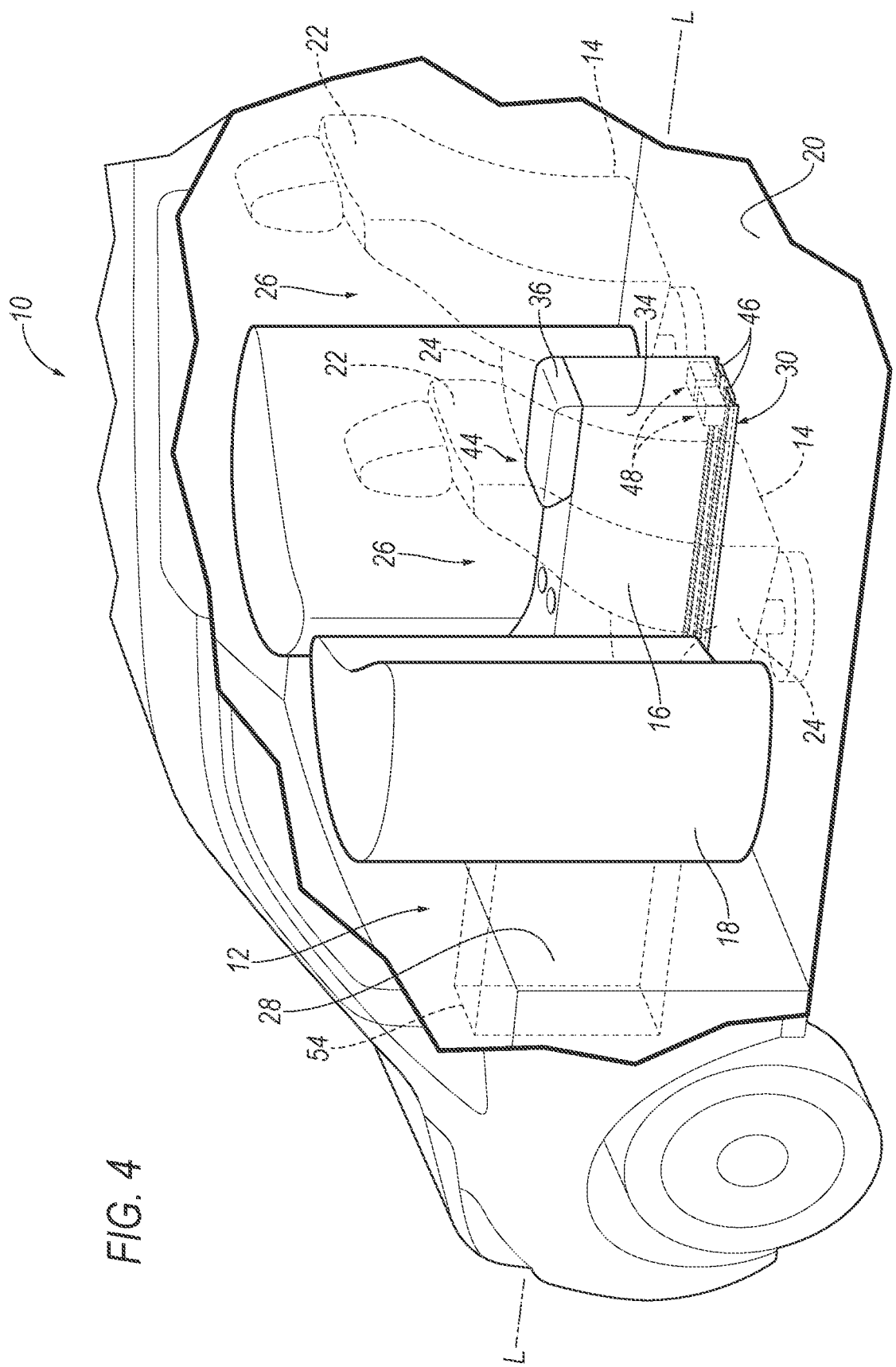
FIG. 4 is a perspective view of the console assembly in the deployed position with airbags on the console assembly in the uninflated position.

With reference to FIGS. 1-3, the vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 includes a vehicle body (not numbered). The vehicle body may be of a unibody construction. In the unibody construction, the body, e.g., rockers, serves as a vehicle frame, and the vehicle body (including the rockers, pillars, roof rails, etc.) is unitary, i.e., a continuous one-piece unit. As another example, the vehicle body and frame may have a body-on-frame construction (also referred to as a cab-on-frame construction). In other words, the vehicle body and frame are separate components, i.e., are modular, and the vehicle body is supported on and affixed to the frame. Alternatively, the vehicle body may have any suitable construction. The vehicle body may be formed of any suitable material, for example, steel, aluminum, etc.

The vehicle 10 defines a passenger compartment to house occupants, if any, of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

The vehicle 10 includes the vehicle floor 20. The vehicle floor 20 may define the lower boundary of the passenger compartment and may extend from the front end of the passenger compartment to the rear end of the passenger compartment. The vehicle floor 20 may include upholstery, for example, carpet, and may have a class-A surface facing the passenger compartment, i.e., a surface specifically manufactured to have a high quality, finished, aesthetic appearance free of blemishes.

With reference to FIGS. 1 and 2, the vehicle 10 may include at least two seats 14 including the first seat 14 and the second seat 14 set forth above. The adjective "first" and "second" is used as an identifier to distinguish between two seats 14 of the vehicle 10 and does not indicate order or importance. The seats 14, e.g., the first seat 14 and the second seat 14, may be arranged as a driver seat 14 and a passenger seat 14. The seats 14 may be supported by the vehicle floor 20, as shown in the example in the Figures. The seats 14 may be arranged in any suitable arrangement in the passenger compartment. As in the example shown in the Figures, one or more of the seats 14 may be at the front end of the passenger compartment, e.g., a driver seat 14 and/or a passenger seat 14. In other examples, one or more of the seats 14 may be behind the front end of the passenger compartment, e.g., at the rear end of the passenger compartment. The seats 14 may be movable relative to the vehicle floor 20 to various positions, e.g., movable fore-and-aft. The seats 14 may be of any suitable type, e.g., a bucket seat 14.

The seat 14 includes a seatback 22 and a seat bottom 24. The seatback 22 may be supported by the seat bottom 24 and may be stationary or movable relative to the seat bottom 24. The seatback 22 and the seat bottom 24 may be adjustable in multiple degrees of freedom. Specifically, the seatback 22 and the seat bottom 24 may themselves be adjustable. In other words, adjustable components within the seatback 22 and/or the seat bottom 24, and/or may be adjustable relative to each other.

The seat 14 may define an occupant seating area 26. The occupant seating area 26 is the space occupied by an occupant properly seat 14*ed* on the seat 14. The occupant seating area 26 is seat-forward of the seatback 22 and above the seat bottom 24.

With continued reference to FIGS. 1 and 2, the vehicle 10 includes at least one dash 12. In the example shown in the Figures, the vehicle 10 includes one dash 12 at the front end of the passenger compartment. In addition, or in the alternative, the vehicle 10 may include another dash 12 at the rear end of the passenger compartment. The dash 12 may also be called a bulkhead. In some examples, the dash 12 may be called an instrument panel.

The dash 12 may be a structural member of the frame of the vehicle 10, i.e., a portion of the frame resists static and dynamic forces from operation of the vehicle 10 without undue deflection or distortion. Examples of forces include a weight of other vehicle 10 components, passengers, and cargo; twisting moments or torsional moments caused by driving over uneven surfaces; torque from a transmission; longitudinal and lateral forces from driving; and possibly forces from impacts with other vehicles 10 or impactors.

The dash 12 may include vehicle controls, such as gauges, dials, screens, and information displays; heating and ventilation equipment; a radio and other electronics; etc. The dash 12, as well as the rest of the vehicle 10, may lack a steering wheel and may lack pedals for accelerating and braking. In other words, as shown in FIGS. 1-3, no steering wheel or pedals for accelerating and braking are supported by or adjacent to the dash 12. More specifically, the vehicle 10 does not include a steering wheel or pedals for accelerating and braking, e.g., the vehicle 10 is autonomous.

The dash 12 may extend from one side of the vehicle 10 to the other side of the vehicle 10, i.e., across the passenger compartment in a cross-vehicle direction. For example, the dash 12 may extend from one body pillar to another body pillar. The dash 12 may extend downwardly from a windshield. For example, the dash 12 may extend from the windshield to the vehicle floor 20 of the vehicle 10.

The first seat 14 and a second seat 14 may be spaced from the dash 12. Specifically, the dash 12 may be spaced vehicle-forward of the first and second seats 14, e.g., at the front end of the passenger compartment, as shown in FIGS. 1-3. The dash 12 faces the seats 14. The dash 12 may, for example, include a class-A surface, i.e., a surface specifically manufactured to have a high quality, finished aesthetic appearance free from blemishes.

The dash 12 may, for example, be flat in the cross-vehicle direction. In other words, the dash 12 may be generally planar. Specifically, a vehicle-rearward face 28 of the dash 12 in the example shown in FIGS. 1-3 may be flat.

With reference to FIGS. 1-4, the vehicle 10 includes a console assembly 30. The console assembly 30 includes the console 16 and an airbag assembly 32. As set forth further below, the airbag assembly 32 is supported by the console 16 and moves with the console 16 as the console 16 moves relative to the dash 12 and seats 14. The console assembly 30 is between two seats 14 in the deployed position and may be called a middle console assembly. The console assembly 30 may be centered cross-vehicle in the passenger compartment, as shown in the Figures. In such an example, the console assembly 30 may be referred to as a center console assembly. In other examples, the console assembly 30 may be in the middle of two adjacent seats 14 and offset from the cross-vehicle center of the vehicle 10.

The console 16 is supported by the vehicle floor 20. In other words, the weight of the console 16 is borne by the vehicle floor 20. The console 16 extends upwardly from the vehicle floor 20 between the first seat 14 and the second seat 14 in the deployed position. The console 16 may include a class-A surface exposed to the passenger cabin, i.e., a finished surface free of unaesthetic blemishes and defects and exposed to view by a vehicle 10 occupant seated in the vehicle 10. The console 16 may include cup holders and may support vehicle 10 controls, e.g., a gear shifter, window controls, HVAC controls, multimedia controls, etc. In addition, or in the alternative, the console 16 includes a base 34 and an armrest 36. The console assembly 30 may include wiring and/or other physical structure connected to electronic components on the console assembly 30 and may extend from the console 16 to the dash 12 in a concealed manner. The console 16 may be, for example, plastic such as acrylonitrile butadiene styrene (ABS), vinyl, etc.

In examples in which the console 16 includes the base 34 and the armrest 36, the armrest 36 is above the base 34 and, for example, may be supported by the base 34. The armrest 36 is designed to support the arm of occupants of the vehicle 10 seated in the front seats 14. Specifically, the armrest 36 is sized, shaped, and positioned to support the arm of the occupant. The armrest 36 may be upholstered, e.g., with a covering of vinyl, leather, etc.

The console 16 may include a storage compartment (not numbered) below the armrest 36. In such an example, the armrest 36 is moveably attached to the base 34. The storage compartment may be designed to store items, e.g., personal items belonging to a vehicle 10 occupant. The armrest 36 may be selectively moveable relative to the base 34 to cover and uncover the storage compartment. In such examples, the base 34 is a bin and the armrest 36 is a lid of the storage compartment to allow access to the storage compartment. As an example, the armrest 36 may be rotatable relative to the storage compartment. In such an example, a hinge rotatably connects the armrest 36 to the console 16. Specifically, the armrest 36 may be rotatable upwardly from the storage compartment about the hinge between a closed position and an open position.

With reference to FIGS. 1-3, the console 16 includes a vehicle-forward end 38 and a vehicle-rearward end 40. The vehicle-forward end 38 is vehicle-forward of the vehicle-rearward end 40. The vehicle-forward end 38 faces vehicle-forward and the vehicle-rearward end 40 faces vehicle-rearward. The console 16 may include two lateral sides 42 spaced from each other and each extending from the vehicle-forward end 38 to the vehicle-rearward end 40. The console 16 terminates at the vehicle-forward end 38, the vehicle-rearward end 40, and the two lateral sides 42. As an example, the console 16 may be rectangular in a horizontal cross-section. The console 16 may be elongated from the vehicle-forward end 38 to the vehicle-rearward end 40.

Specifically, the console 16 may be elongated along the vehicle-longitudinal axis L. The console 16 has an uppermost side 44 that faces upwardly. The console 16 terminates at the uppermost side 44. The uppermost side 44 may be, for example, on the armrest 36.

The console 16 is moveably engaged with the vehicle floor 20. Specifically, the console 16 is moveable relative to the vehicle floor 20 from the stowed position to the deployed position. The console 16 moves along a vehicle-longitudinal axis L between the stowed position and the deployed position. Specifically, the console 16 moves vehicle-rearward along the vehicle-longitudinal axis L when the console 16 slides from the stowed position to the deployed position and vehicle-forward along the vehicle-longitudinal axis L when the console 16 slides from the deployed position to the stowed position.

With reference to FIGS. 1-3, the vehicle 10 may include one or more track 46 between the console assembly 30 and the vehicle floor 20. In the example shown in the Figures, the vehicle 10 includes two tracks 46 spaced cross-vehicle from each other. The track 46 may be a component of the console 16 and/or a component of the vehicle floor 20. In any event, the track 46 is between the console 16 and the vehicle floor 20. The track 46 guides movement of the console 16 relative to the vehicle floor 20 between the deployed and stowed positions. The track 46 guides may restrict movement of the console 16 relative to the vehicle floor 20 to linear movement, i.e., linear movement parallel to the vehicle-longitudinal axis L.

With reference to FIG. 1, the assembly may include one or more track actuators 48 between the track 46 and the console 16. The track actuator 48 moves the console 16 relative to the track 46. The track 46 is drivably coupled to the console 16 to move the console 16 along the track 46 between the stowed position and the deployed position.

Figure 5:
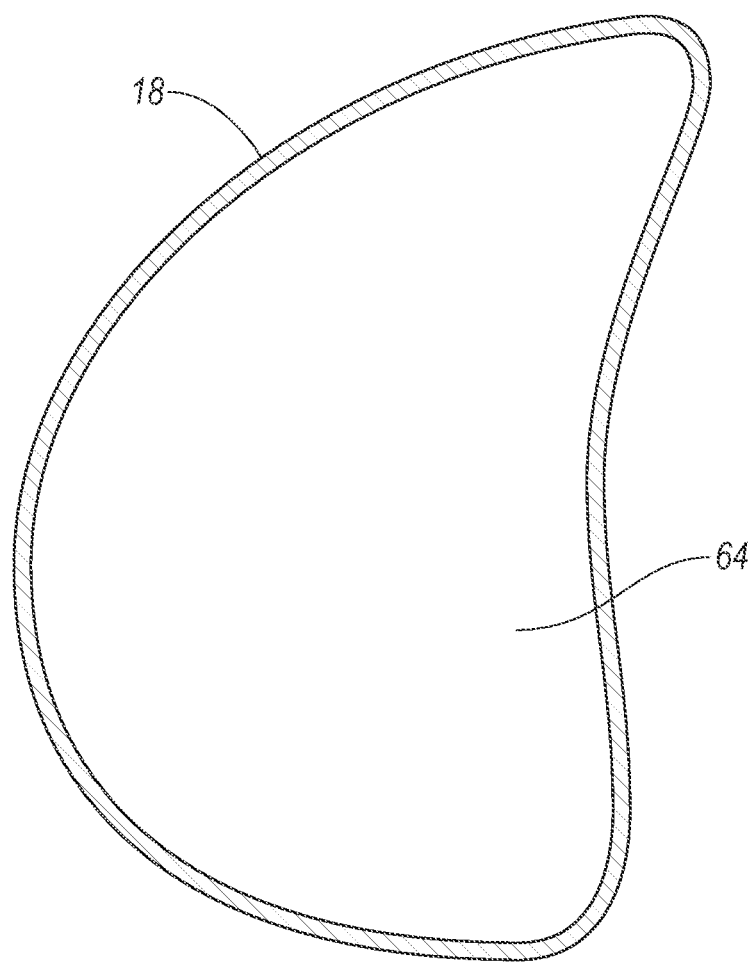
FIG. 5 is a cross-sectional view of the airbag.

With reference to FIG. 5, the track 46 may be toothed (i.e., is a rack) and the track actuator 48 may include a pinion 50 rotatably engaged with the track 46. In such an example, a motor 52, e.g., an electric motor, rotates the pinion 50 to linearly move along the track 46 to slide the console 16 along the track 46. The motor 52 may be activated to move the console 16 relative to the vehicle floor 20 from the stowed position to the deployed position and from the deployed position to the stowed position based on occupancy of the seats 14, e.g., based on detection of an occupant by an occupancy sensor 68, as described further below.

As another example, in the alternative to the track actuator 48 shown in FIG. 5, the track actuator 48 may include a motor and a lead screw. In such an example, the motor is engaged with the lead screw to rotate the lead screw. The motor rotates the lead screw to move the console 16 between the stowed position and the deployed position. Specifically, the motor is fixed to one of the console 16 or the vehicle floor 20 and a carriage fixed to the other of the console 16 or the vehicle floor 20. The carriage is threadedly engaged with the threads of the lead screw such that rotation of the lead screw by the motor linearly moves the carriage and the console 16 relative to the vehicle floor 20.

In the example shown in the Figures, the console 16 is movable from the stowed position (FIG. 1) disposed in the dash 12 to the deployed position (FIG. 2) extending from the dash 12. In such an example, the console 16 is movable between the first seat 14 and the second seat 14. Specifically, the console 16 includes a tunnel 54 and the console 16 is moveable out of the tunnel 54 to the deployed position and is moveable into the tunnel 54 to the retracted position.

As shown in FIG. 1, in the stowed position, the console 16 is retracted in the dash 12. For example, in the example shown in the Figures, the console 16 may be retracted in the tunnel 54. The stowed position of the console 16 allows for space within the passenger compartment for occupants to move without obstruction of the console 16.

In the stowed position, components of the console 16 may be disposed in the dash 12, e.g., in the tunnel 54. For example, the armrest 36, cup holders, vehicle 10 controls (e.g., a gear shifter, window controls, HVAC controls, multimedia controls, etc.), etc. may be in the dash 12, e.g., in the tunnel 54, in the stowed position.

In some examples, the console 16 may be flush with the dash 12 in the stowed position, as shown in the example shown in FIG. 1. Specifically, the vehicle-rearward end 40 is flush with the vehicle-rearward face 28 of the dash 12 in the stowed position and spaced from the vehicle-rearward face 28 dash 12 in the deployed position. In other words, the vehicle-rearward end 40 may be aligned with the vehicle-rearward face 28 of the dash 12 along the vehicle-longitudinal axis L. Specifically, the boundary of the console 16 adjacent the tunnel 54 is co-planar with the vehicle-rearward face 28 of the dash 12 at the tunnel 54 in the stowed position and the contours of the console 16 adjacent the tunnel 54 matches the contours of the vehicle-rearward face 28 of the dash 12 at the tunnel 54 in the stowed position, as shown in the example on FIG. 1.

In the deployed position, the console 16 is extended from the dash 12. The console 16 moves vehicle-rearward from the dash 12 from the stowed position to the deployed position. Specifically, the vehicle-rearward end 40 of the console 16 is spaced from the vehicle-rearward face 28 of the dash 12 vehicle-rearward of the dash 12 in the deployed position. As an example, the console 16 may move parallel to the vehicle-longitudinal axis L from the stowed position to the deployed position and from the deployed position to the stowed position.

In the deployed position, components of the console 16 may be spaced from the dash 12, e.g., outside the tunnel 54. For example, the armrest 36, cup holders, vehicle 10 controls (e.g., a gear shifter, window controls, HVAC controls, multimedia controls, etc.), etc. may be spaced from the dash 12, e.g., outside the tunnel 54, in the deployed position.

The vehicle-forward end 38 of the console 16 may be engaged with the dash 12 in the deployed position. In other words, the vehicle-forward end 38 of the console 16 may be retained in the tunnel 54 of the dash 12 in the deployed position.

Figure 6A:
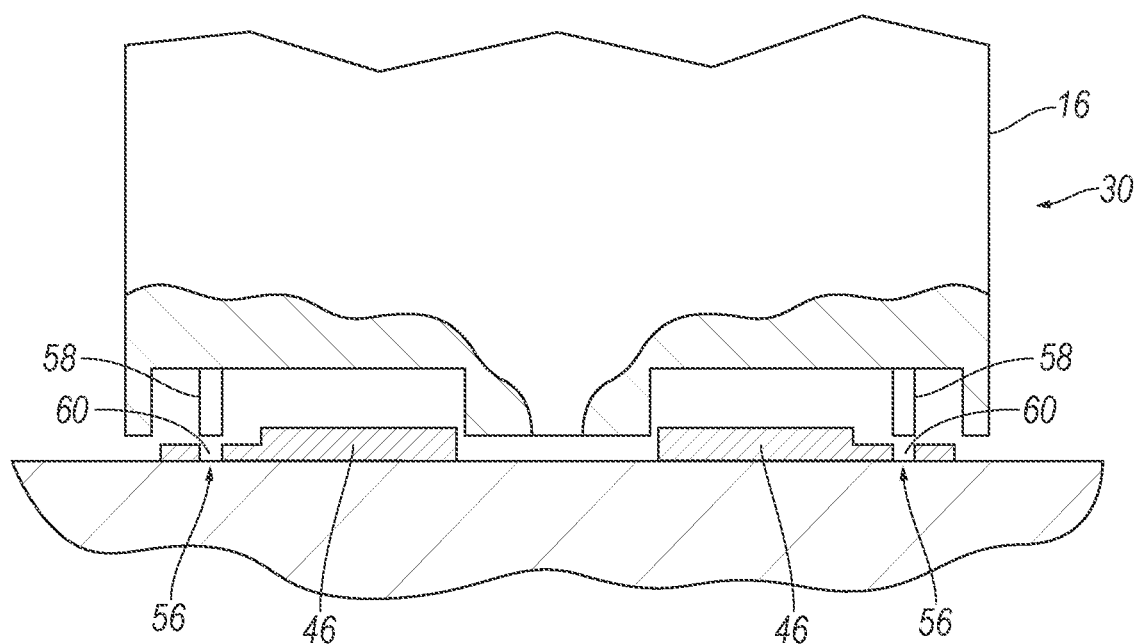
FIG. 6A is a cross-sectional view of a portion of the console assembly.
Figure 6B:
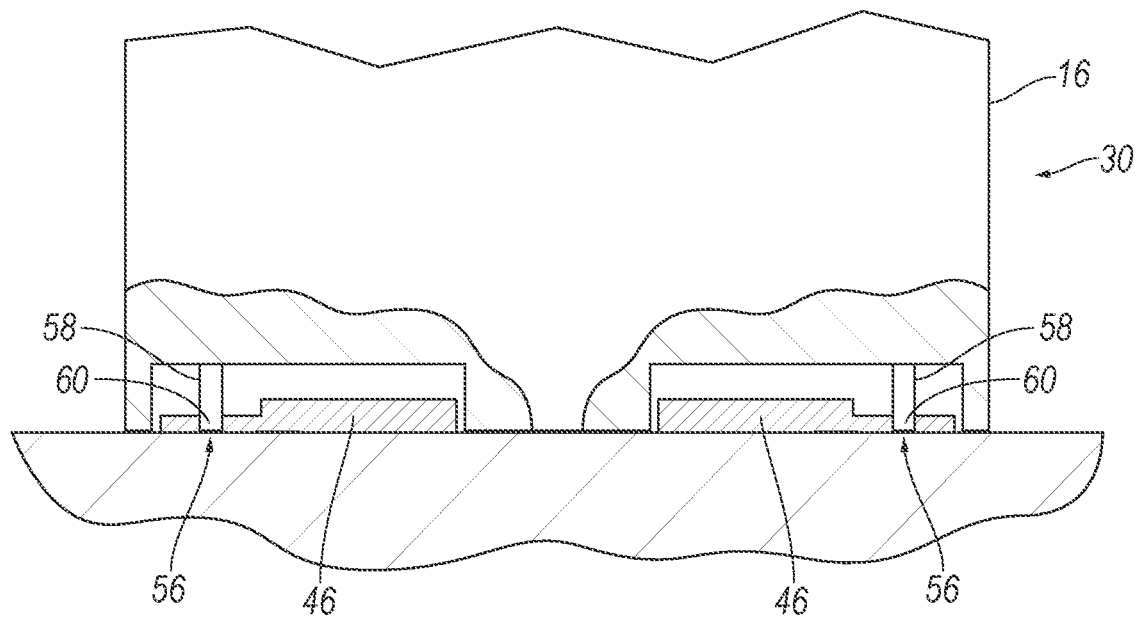
FIG. 6B is the cross-sectional view of FIG. 6A with pegs on the console engaged with holes in the vehicle floor.

With reference to FIGS. 3 and 6A-B, the console assembly 30 may include a lock 56 to lock the console 16 relative to the vehicle floor 20 and the dash 12 in the deployed position in the event of a vehicle impact. The lock restricts movement of the console 16 vehicle-forward along the tracks 46 in the event an occupant loads the airbag 18 in certain impacts and/or the console 16 during a vehicle impact. The lock 56 may be mechanically activated under forces associated with vehicle impact, as described below. In other examples, the lock 56 may be electronically activated, e.g., locked and unlocked as commanded by a computer of the vehicle 10.

Specifically, during certain vehicle impact in which an occupant of the seat 14 loads the airbag 18, the occupant may urge the console 16 vehicle-forward. In such an event the console 16 may tilt, i.e., the vehicle-forward end 38 of the console 16 may tilt downwardly toward the vehicle floor 20 and/or the vehicle-rearward end 40 of the console 16 may tilt upwardly away from the vehicle floor 20. The lock 56 may include a peg 58 on one the console 16 or the vehicle floor 20/track 46 and a hole 60 on the other of the console 16 or the vehicle floor 20/track 46. In the example shown in the Figures, the peg 58 is on the console 16 and the hole 60 is on the track 46 (and in other examples the hole 60 may be on the vehicle floor 20). The peg 58 and the hole 60 are positioned so that the peg 58 and the hole 60 are vertically aligned when the console 16 is in the extended position. FIG. 6A shows the console 16 in the deployed position and the position of the console 16 relative to the vehicle floor 20 in the absence of tilting, and FIG. 6B shows the console 16 in the deployed position and the position of the console 16 relative to the vehicle floor 20 when the console 16 tilts when the airbag 18 is loaded by an occupant during certain impacts. With reference to FIG. 6A, the peg 58 is disengaged with the hole 60 in the absence of tilting of the console 16. Accordingly, the console 16 is free to move from the deployed position to the retracted position, i.e., under the power of the motor 52, without interference between the peg 58 and the hole 60. With reference to FIG. 6B, the tilting of the console 16 engages the peg 58 in the hole 60 to resist vehicle-forward movement of the console 16.

As set forth above, the console assembly 30 includes the airbag assembly 32. Specifically, the console assembly 30 includes at least one airbag assembly 32 and, in the example shown in the Figures, the console assembly 30 includes two airbag assemblies 32. The airbag assembly 32 includes the airbag 18 and an inflator 62.

The airbag assembly 32, and specifically the airbag 18, is supported by the console 16. In other words, the weight of the airbag assembly 32 is borne by the console 16. The airbag 18 may be in an uninflated position when the console 16 is in the stowed position and/or when the console 16 is in the deployed position. In the uninflated position, the airbag 18 and the second airbag 18 may be rolled and/or folded on the console 16. The airbag 18 is inflatable to the inflated position when the console 16 is in the deployed position. The airbag 18 is inflatable upwardly between the dash 12 and the respective first seat 14 and the second seat 14 from the uninflated position to the inflated position. In the event of a vehicle impact, e.g., a frontal impact, the airbag 18 is inflated to the inflated position to control the kinematics of the occupants of the seat 14.

The airbag 18 in the inflated position inflates vehicle-outboard and upwardly from the console 16 between the dash 12 and the seat 14. In the example shown in the Figure, the airbag 18 abuts the dash 12 in the inflated position. Specifically, the airbag 18 may use the dash 12 as a reaction surface to control the kinematics of the occupants.

The airbag 18 is between the dash 12 and the occupant seating area 26 of the seat 14. The airbag 18 may be horizontally aligned with the seat bottom 24. In other words, at least a portion of the airbag 18 is in a common horizontal plane with the seat bottom 24. Specifically, a lower portion of the airbag 18 is between the seat bottom 24 and the dash 12 in a horizontal plane.

The airbag 18 may be fabric, e.g., a woven polymer yarn. The woven polymer yarn may be, for example, nylon 66. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

With reference to FIG. 5, the airbag 18 includes an inflation chamber 64. The airbag assembly 32 includes at least one inflator 62. In examples including two airbags 18 as shown in the Figures, one inflator 62 may inflate both airbag 18s, e.g., through separate fill tubes. As another example, the airbag assembly 32 may include one inflator 62 in fluid communication with one airbag 18 and another inflator 62 in fluid communication with the other airbag 18.

The inflator 62 may be supported by the console 16. The inflator 62 may be directly or indirectly mounted to the console 16, e.g., with fasteners such as threaded fasteners, push-pins, Christmas-tree fasteners, etc.

The inflator 62 is fluidly connected to the airbag 18. Specifically, the inflator 62 expands the airbag 18 with inflation medium, such as a gas, to move the airbag 18 from the uninflated position to the inflated position. The inflator 62 may be, for example, a pyrotechnic inflator 62 that ignites a chemical reaction to generate the inflation medium, a stored gas inflator 62 that releases (e.g., by a pyrotechnic valve) stored gas as the inflation medium, or a hybrid. The airbag assembly 32 may include any suitable number of inflators 62.

Figure 7:
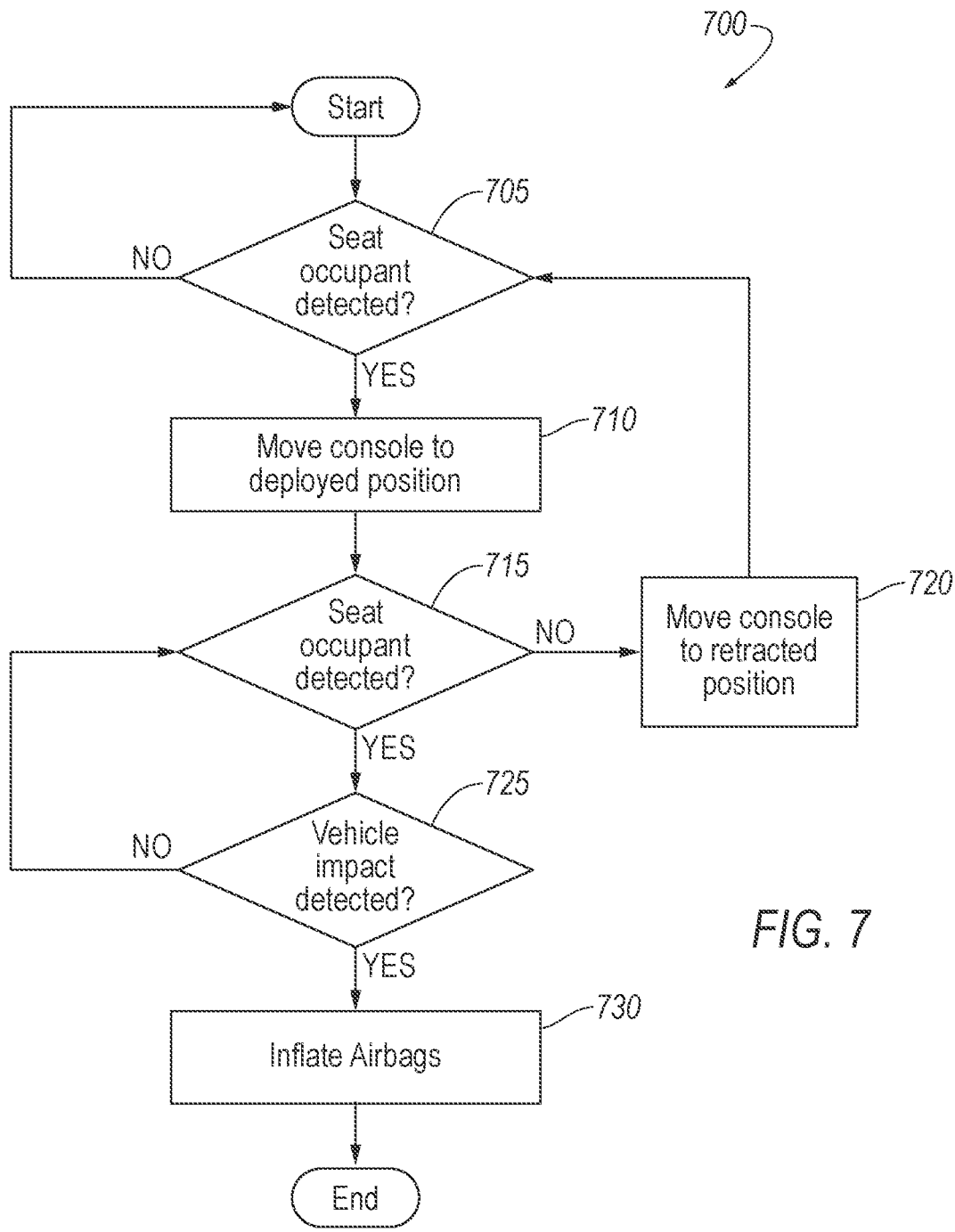
FIG. 7 is a flow chart showing an example method the vehicle.
Figure 8:
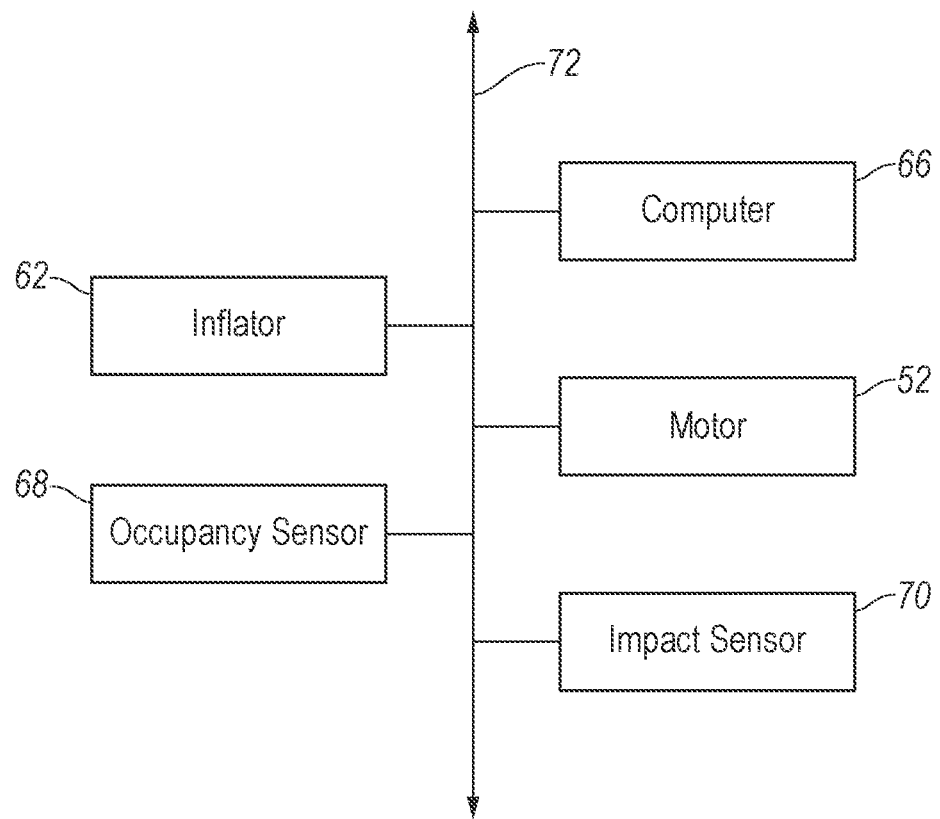
FIG. 8 is a block diagram of a system of the vehicle.

With reference to FIG. 8, the vehicle 10 includes a computer 66 including a processor and a memory. The computer 66 may be a restraints control module. The memory includes one or more forms of computer 66 readable media, and stores instructions executable by the computer 66 for performing various operations, including as disclosed herein and including, for example, method 700 shown in FIG. 7 and described below. For example, the computer 66 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a computer 66 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 66. The memory may be of any type, e.g., hard disk drives, solid state drives, servers, or any volatile or non-volatile media. The memory may store the collected data sent from the sensors. The memory may be a separate device from the computer 66, and the computer 66 may retrieve information stored by the memory via a network in the vehicle 10, e.g., over a CAN bus, a wireless network, etc. Alternatively or additionally, the memory may be part of the computer 66, e.g., as a memory of the computer 66.

As shown in FIG. 8, the computer 66 is generally arranged for communications on a vehicle communication network 72 that may include a bus in the vehicle 10 such as a controller area network CAN or the like, and/or other wired and/or wireless mechanisms. Alternatively or additionally, in cases where the computer 66 includes a plurality of devices, the vehicle communication network 72 may be used for communications between devices represented as the computer 66 in this disclosure. Further, as mentioned below, various controllers and/or sensors may provide data to the computer 66 via the vehicle communication network 72.

The vehicle 10 may include at least one impact sensor 70 for sensing impact of the vehicle 10. The computer 66 is in communication with the impact sensor 70 and the inflator 62. The computer 66 may activate the inflators 64, e.g., provide an impulse to a pyrotechnic charge of the inflator 62 when the impact sensor 70 senses an impact of the vehicle 10. Alternatively or additionally to sensing impact, the impact sensor 70 may be configured to sense impact prior to impact, i.e., pre-impact sensing. The impact sensor 70 may be in communication with the computer 66. The impact sensor 70 is configured to detect an impact to the vehicle 10. The impact sensor 70 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 70 may be located at numerous points in or on the vehicle 10.

The vehicle 10 may include at least one occupancy sensor 68. The occupancy sensor 68 configured to detect occupancy of the seats 14. The occupancy sensor 68 may be visible-light or infrared cameras directed at the seat 14, weight sensors supported by the seat bottom 24, sensors detecting whether a seatbelt assembly for the seat 14 is buckled, or other suitable sensors. The occupancy sensor 14 provides data to the computer 16 specifying whether the seat 14 is occupied or unoccupied.

With reference to FIG. 7, the vehicle computer 66 stores instructions to control components of the vehicle 10 according to the method 700 shown in FIG. 7. Specifically, the method 700 includes moving the console 16 between the stowed position and the deployed position based on occupancy of the seat 14 and inflating the airbag 18 when the console 16 is in the deployed position and a vehicle impact, e.g., a frontal impact, is detected. Use of "in response to," "based on," and "upon determining" herein, including with reference to method 900, indicates a causal relationship, not merely a temporal relationship.

With reference to FIG. 7, the method 700 is initiated with initial detection of an occupant in one of the seats 14, as shown in block 705. When an occupant is detected in at least one of the seats 14, the method 700 includes moving the console 16 from the stowed position to the deployed position, as shown in block 710. Specifically, block 710 may include providing a command to the motor 52 to move the console 16 relative to the track 46 from the stowed position to the deployed position.

While the console 16 is in the deployed position, the method 700 continues to monitor occupancy of the seat 14, as shown in block 715, e.g., based on detections by the occupancy sensor 68. At block 715, if vacancy of both seats 14 is detected (e.g., as a detection of no occupant on the seats 14 or lack of detection of an occupant on either seat 14), the method 700 includes moving the console 16 to the stowed position, as shown in block 720. Specifically, block 720 may include providing a command to the motor 52 to move the console 16 relative to the track 46 from the deployed position to the stowed position.

At block 715, if occupancy of the seat 14 is continued to be detected, the method 700 includes monitoring for vehicle impact. If no vehicle impact is detected, the method 700 continues to monitor for seat occupancy in block 715 and vehicle impact in block 725. If vehicle impact is detected in block 725, the method 700 includes inflating the airbags 18 while the console 16 is in the deployed position.

The numerical adjectives "first," "second," etc., are used throughout this document as identifiers and do not signify order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a dash;
   a vehicle floor;
   a first seat and a second seat;
   a console adjacent to the dash;
   the console being movable relative to the dash along an axis between a stowed position and a deployed position, the console being disposed in the dash in the stowed position and movable away from the dash between the first seat and the second seat from the stowed position to the deployed position;

a lock configured to lock the console relative to the dash in the deployed position; and an airbag supported by the console, the airbag being inflatable to an inflated position when the console is in the deployed position;

the lock including a peg on one of the console or the vehicle floor and a hole on the other of the console or the vehicle floor; and the peg and the hole being positioned so that the peg and the hole are vertically aligned with each other along the axis when the console is in the deployed position and are spaced from each other along the axis when the console is in the stowed position.

2. The vehicle of claim 1, wherein the airbag in the inflated position extends between the first seat and the dash.

3. The vehicle of in claim 2, further comprising a second airbag supported by the console and inflatable to an inflated position when the console is in the deployed position, the second airbag in the inflated position extending between the second seat and the dash.

4. The vehicle of claim 3, wherein the console is between the airbag and the second airbag in the inflated position.

5. The vehicle of claim 3, wherein:
the airbag in the inflated position is between the first seat and the dash and extends vehicle-rearward from the dash vehicle-outboard of the first seat; and
the second airbag in the inflated position is between the second seat and the dash and extends vehicle-rearward from the dash vehicle-outboard of the second seat.

6. The vehicle of claim 2, wherein the airbag in the inflated position extends vehicle-outboard of the first seat.

7. The vehicle of claim 2, wherein the first seat includes a seat bottom and the airbag in the inflated position is horizontally aligned with the seat bottom.

8. The vehicle of claim 2, wherein the first seat includes a seat bottom and the airbag in the inflated position is between the seat bottom and the dash and extends vehicle-rearward from the dash vehicle-outboard of the first seat.

9. The vehicle of claim 1, wherein the console includes a vehicle-forward end engaged with the dash in the deployed position.

10. The vehicle of claim 1, wherein the airbag in the inflated position abuts the dash.

11. The vehicle of claim 1, further comprising a track between the console and the vehicle floor, the console being moveable along the track from the stowed position to the deployed position.

12. The vehicle of claim 1, further comprising an inflator supported by the console and fluidly connected to the airbag.

13. The vehicle of claim 1, wherein the dash includes a tunnel that receives the console in the stowed position.

14. The vehicle of claim 13, wherein the console includes a vehicle-forward end engaged with the tunnel of the dash in the deployed position.

15. The vehicle of claim 14, wherein the console includes a vehicle-rearward end, the vehicle-rearward end being flush with the dash at the tunnel in the stowed position and spaced from the dash in the deployed position.

16. The vehicle of claim 1, wherein the console includes a vehicle-rearward end, the vehicle-rearward end being flush with the dash in the stowed position and spaced from the dash in the deployed position.

17. The vehicle of claim 16, further comprising a track between the console and the vehicle floor, the console being moveable along the track from the stowed position to the deployed position, the vehicle-rearward end being engaged with the track in the deployed position.

18. The vehicle of claim 1, wherein the console is tillable relative to the vehicle floor and the lock is designed such that tilting of the console relative to the vehicle floor engages the peg in the hole.

* * * * *

UNITED STATES PATENT AND TRADEMARK OFFICE
CERTIFICATE OF CORRECTION

PATENT NO. : 11,884,229 B1
APPLICATION NO. : 17/821242
DATED : January 30, 2024
INVENTOR(S) : Mohammad Omar Faruque et al.

It is certified that error appears in the above-identified patent and that said Letters Patent is hereby corrected as shown below:

In the Claims

Column 11, Line 18, Claim 3:   delete "in"
Column 11, Line 22, Claim 3:   change "scat" to --seat--
Column 12, Line 33, Claim 18:  change "tillable" to --tiltable--

Signed and Sealed this
Twenty-seventh Day of February, 2024

*Katherine Kelly Vidal*

Katherine Kelly Vidal
*Director of the United States Patent and Trademark Office*